United States Patent
Gonzalez-Alberquilla et al.

(10) Patent No.: US 9,983,880 B2
(45) Date of Patent: May 29, 2018

(54) METHOD AND APPARATUS FOR IMPROVED THREAD SELECTION

(71) Applicant: Intel Corporation, Santa Clara, CA (US)

(72) Inventors: Rekai Gonzalez-Alberquilla, L'Hospitalet de Llobregat (ES); Tanausu Ramirez, Barcelona (ES); Josep M. Codina, L'Hospitalet del Llobregat (ES); Enric Gibert Codina, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 14/497,974

(22) Filed: Sep. 26, 2014

(65) Prior Publication Data

US 2016/0092235 A1    Mar. 31, 2016

(51) Int. Cl.
G06F 9/38 (2006.01)
G06F 9/48 (2006.01)
G06F 12/10 (2016.01)
G06F 12/1027 (2016.01)
G06F 12/1036 (2016.01)

(52) U.S. Cl.
CPC .......... *G06F 9/3851* (2013.01); *G06F 9/3824* (2013.01); *G06F 9/3836* (2013.01); *G06F 9/3855* (2013.01); *G06F 9/3867* (2013.01); *G06F 9/4881* (2013.01); *G06F 12/1027* (2013.01); *G06F 12/1036* (2013.01); *G06F 2212/68* (2013.01); *G06F 2212/684* (2013.01)

(58) Field of Classification Search
CPC ................ G06F 9/3851; G06F 9/3824; G06F 2212/684; G06F 2212/68; G06F 2212/681; G06F 2212/682; G06F 2212/683; G06F 9/485; G06F 9/4881; G06F 12/1027; G06F 9/3836; G06F 9/3855; G06F 9/3867; G06F 12/1036
USPC ........................ 712/214–219; 711/205–207
See application file for complete search history.

(56) References Cited

U.S. PATENT DOCUMENTS

| | | | | |
|---|---|---|---|---|
| 5,613,083 | A * | 3/1997 | Glew | .................. G06F 12/1027 711/207 |
| 6,237,073 | B1 * | 5/2001 | Dean | .................... G06F 11/3466 711/118 |

(Continued)

FOREIGN PATENT DOCUMENTS

| | | |
|---|---|---|
| CN | 1251136 C | 4/2006 |
| TW | 201338541 A | 9/2013 |

OTHER PUBLICATIONS

First Office Action and Search Report for foreign counterpart China Application No. 104137730, dated Jan. 23, 2017, 10 pages.

*Primary Examiner* — Daniel H Pan
(74) *Attorney, Agent, or Firm* — Nicholson De Vos Webster & Elliott LLP

(57) ABSTRACT

An apparatus and method are described for improved thread selection. For example, one embodiment of a processor comprises: first logic to maintain a history table comprising a plurality of entries, each entry in the table associated with an instruction and including history data indicating prior hits and/or misses to a cache level and/or a translation lookaside buffer (TLB) for that instruction; and second logic to select a particular thread for execution at a particular processor pipeline stage based on the history data.

16 Claims, 11 Drawing Sheets

(56) References Cited

U.S. PATENT DOCUMENTS

| | | | |
|---|---|---|---|
| 6,697,935 B1 * | 2/2004 | Borkenhagen | G06F 9/3851 712/228 |
| 7,558,939 B2 * | 7/2009 | Banerjee | G06F 12/1027 711/205 |
| 8,261,276 B2 * | 9/2012 | Bose | G06F 9/4893 711/135 |
| 2006/0059474 A1 * | 3/2006 | Bhansali | G06F 12/0276 717/151 |
| 2009/0172361 A1 * | 7/2009 | Holloway | G06F 9/3851 712/220 |

* cited by examiner

METHOD AND APPARATUS FOR IMPROVED THREAD SELECTION

BACKGROUND

Field of the Invention

This invention relates generally to the field of computer processors. More particularly, the invention relates to a method and apparatus for improved thread selection within a processor.

Description of the Related Art

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the microarchitecture, which is the internal architecture of the processor implementing the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
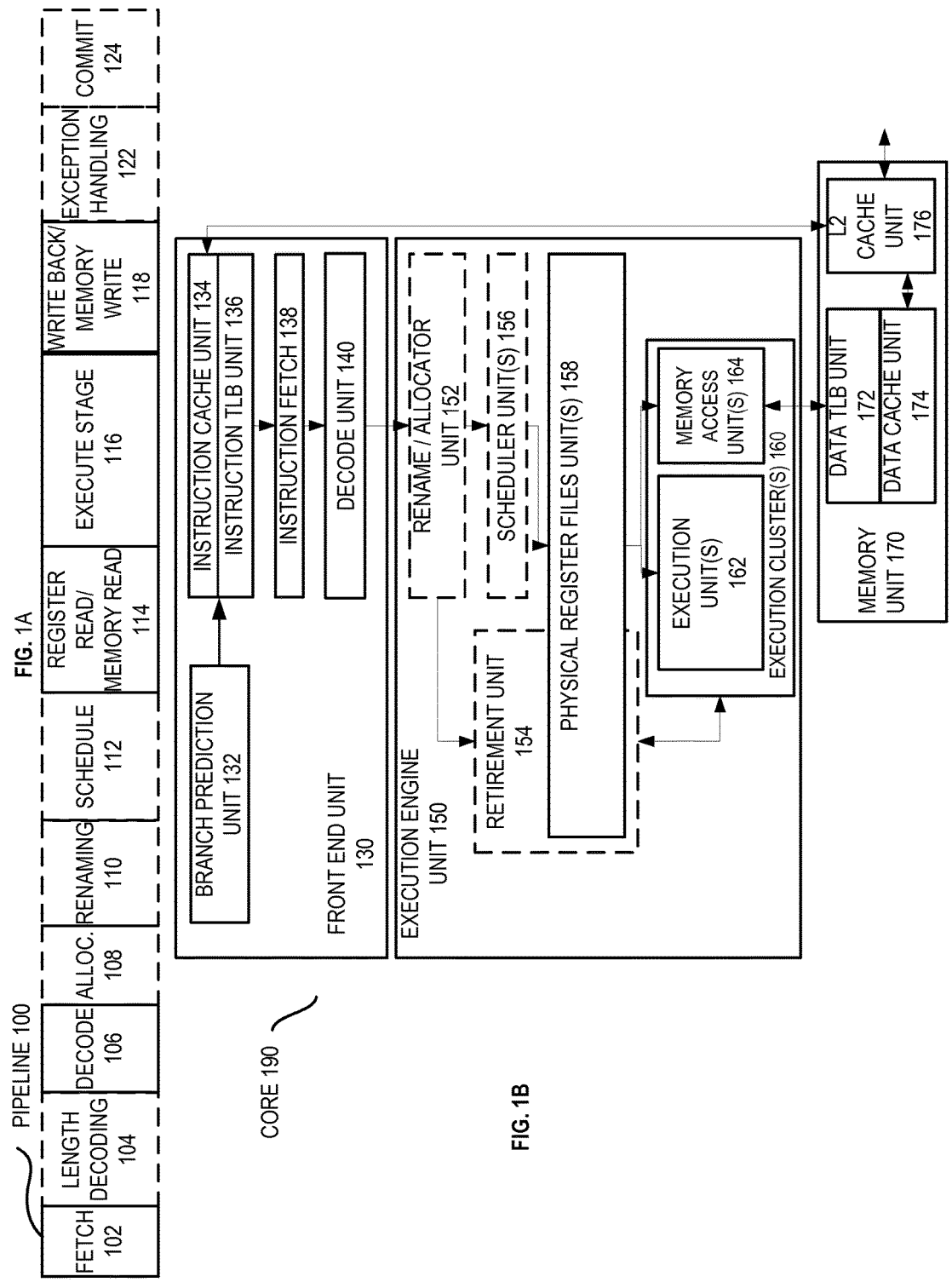
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type.

As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
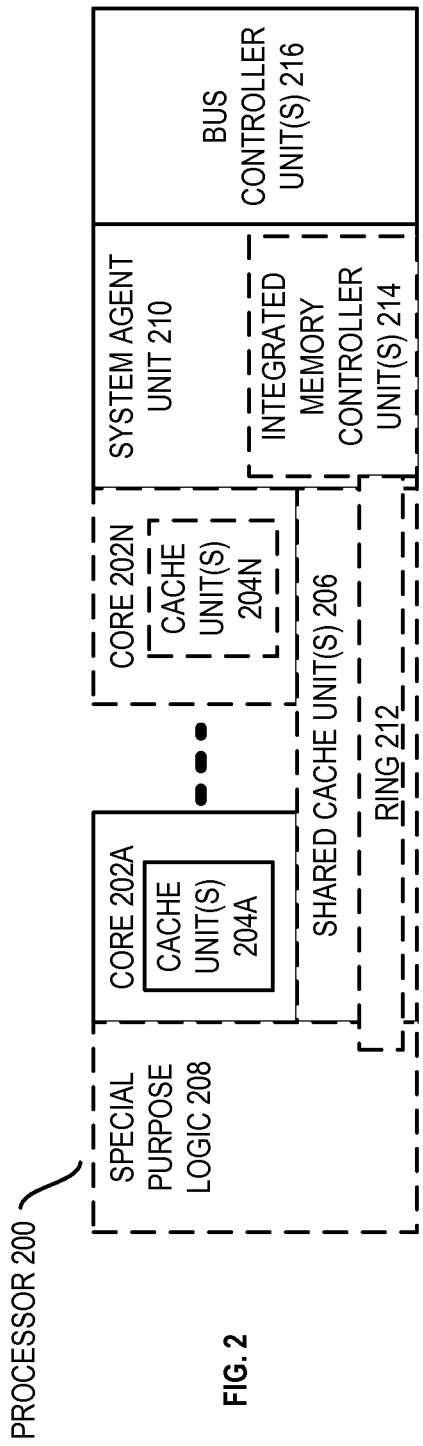
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
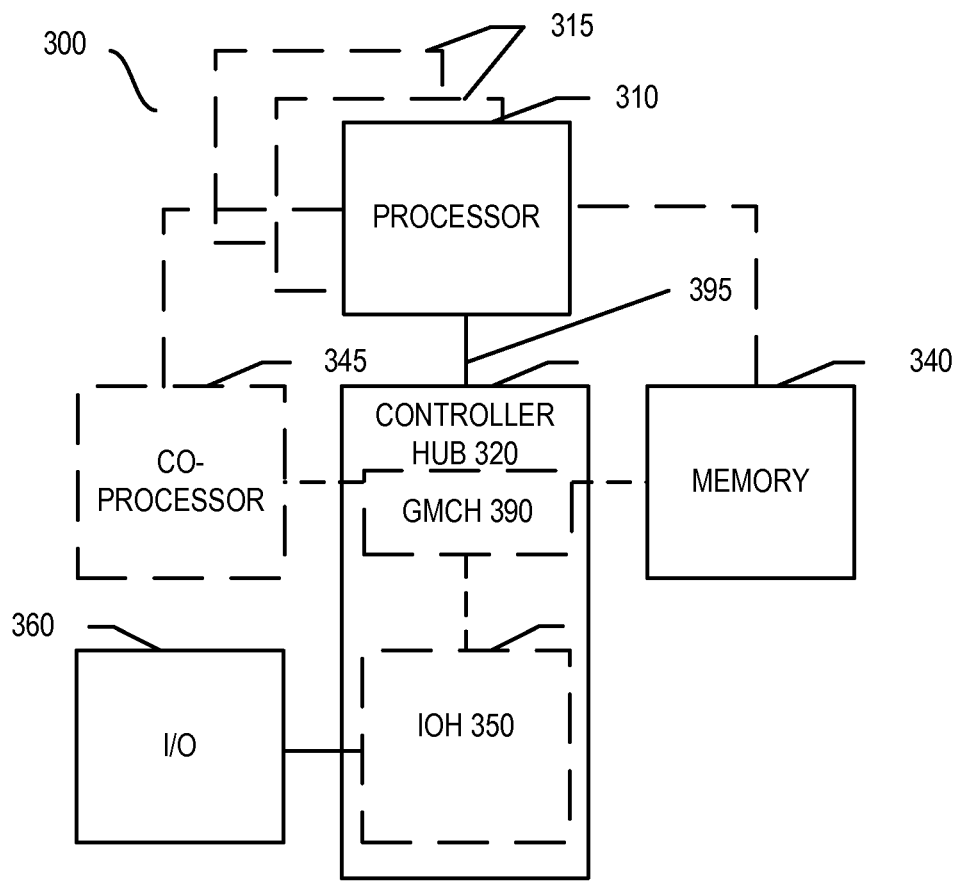
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
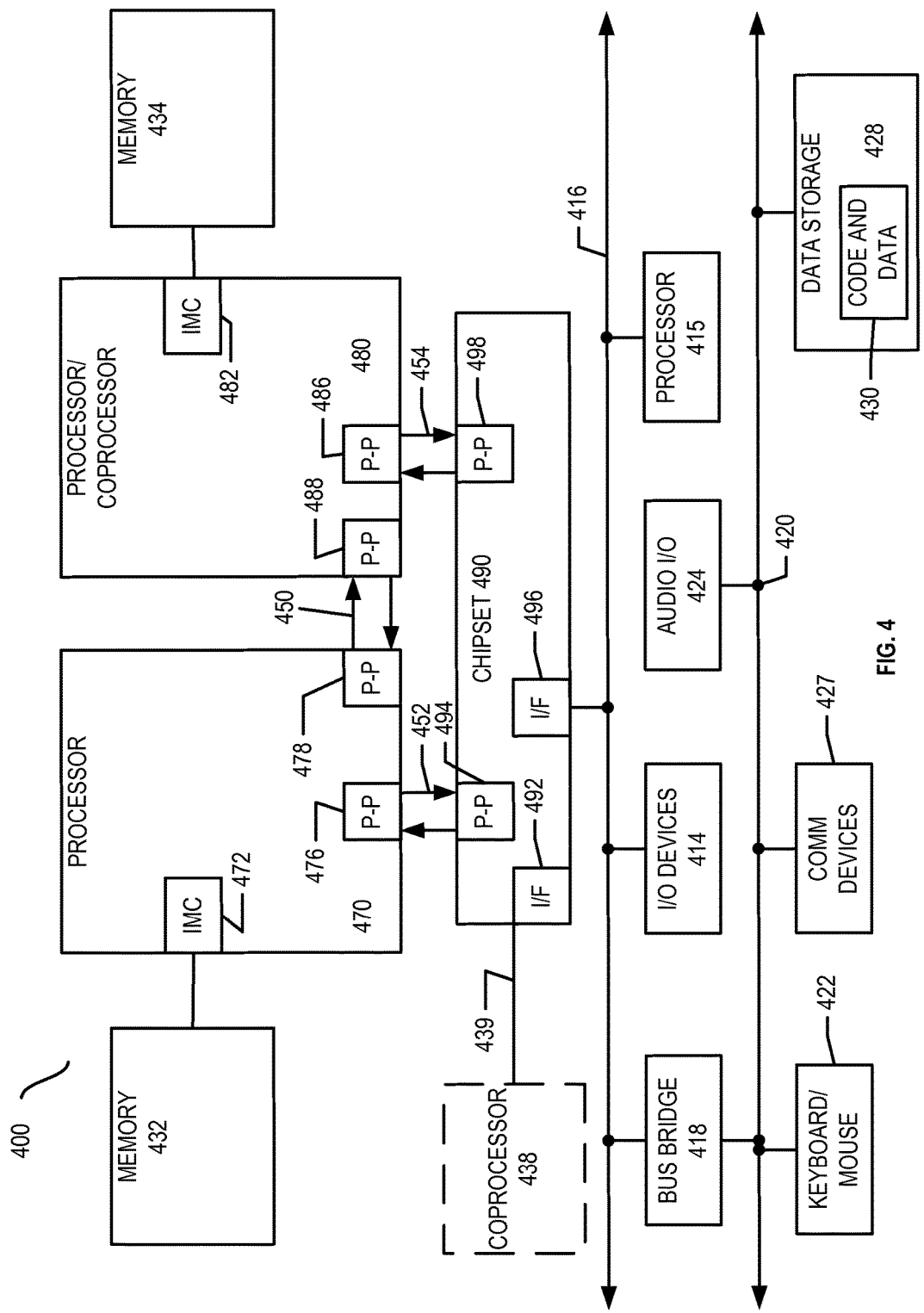
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
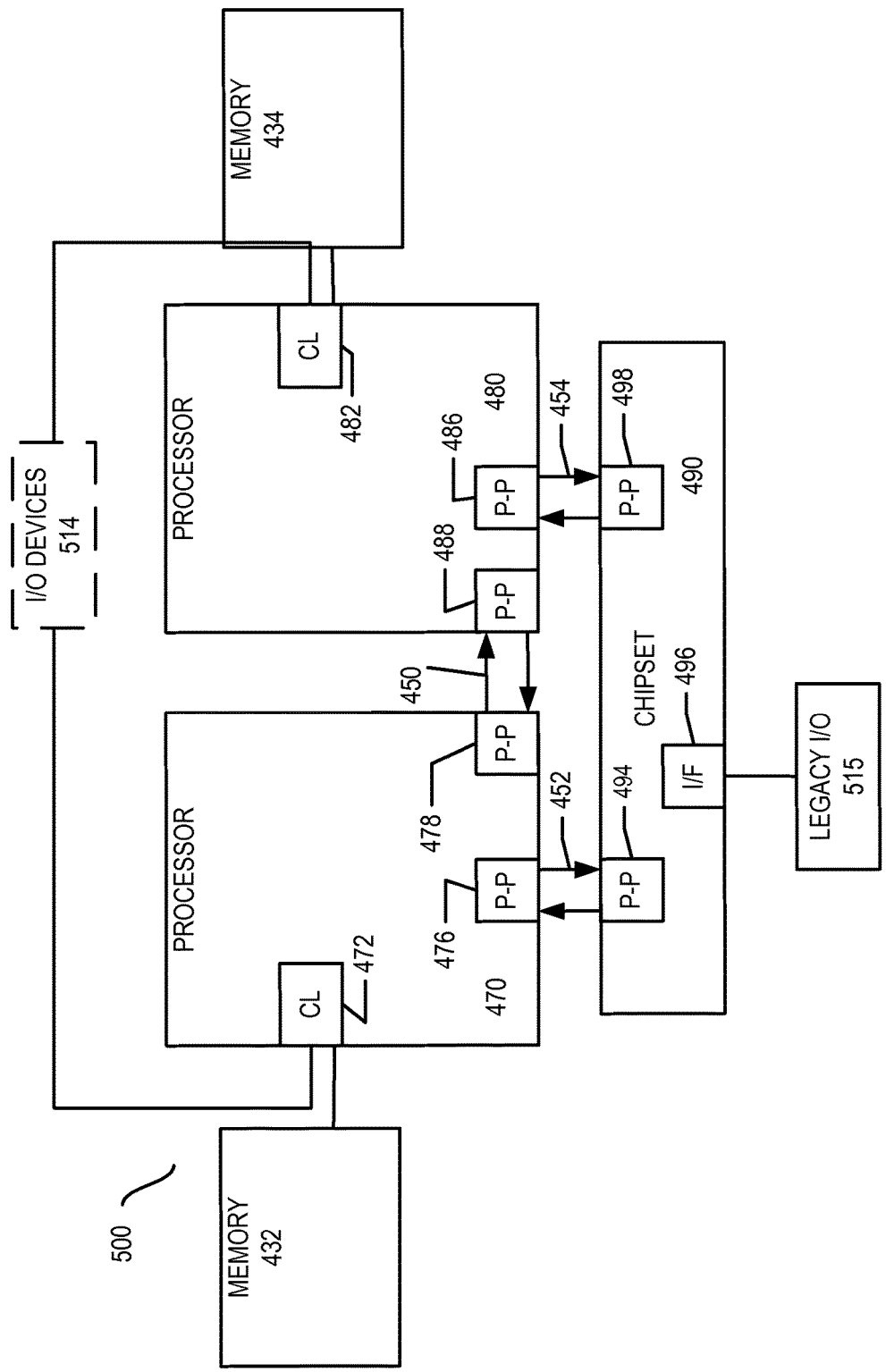
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
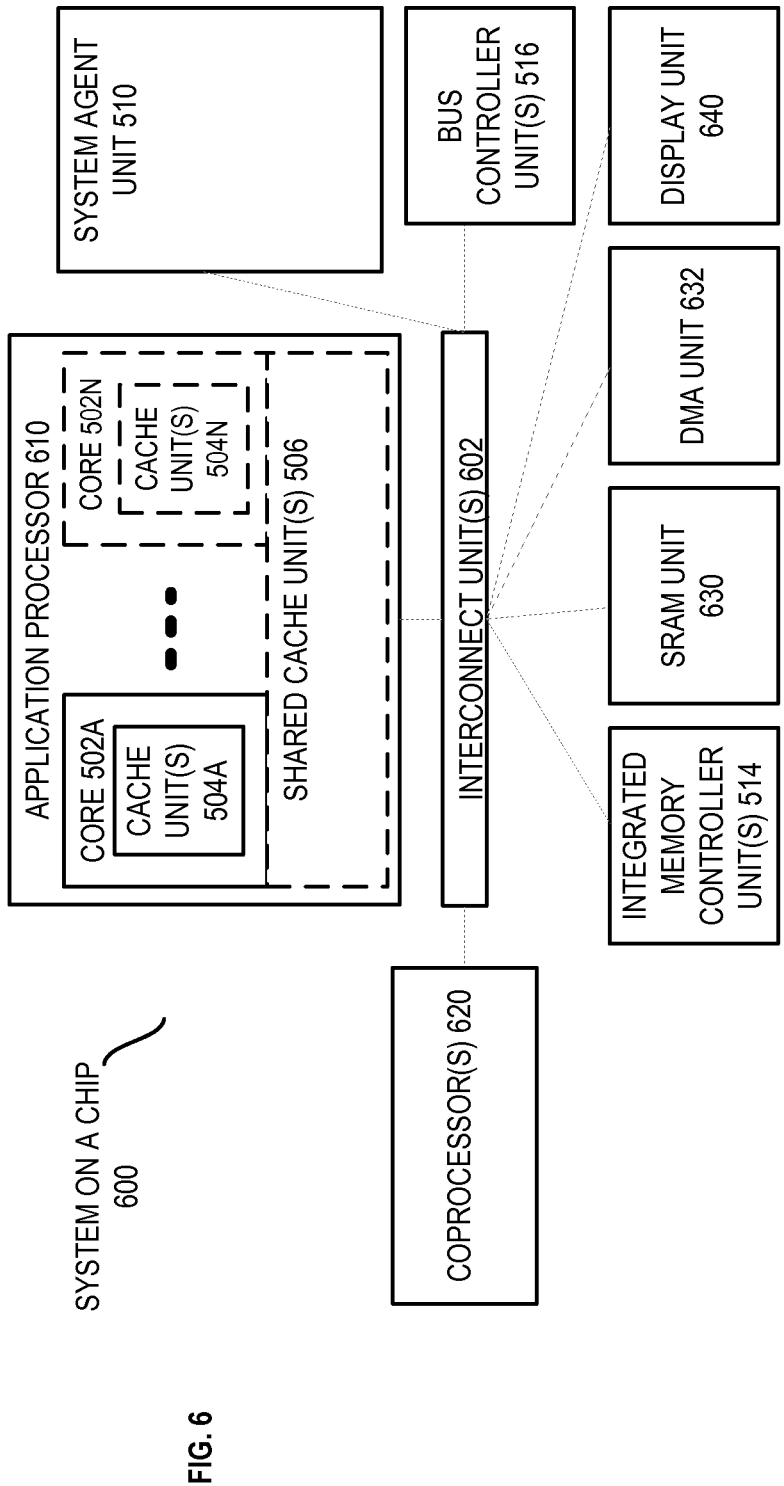
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
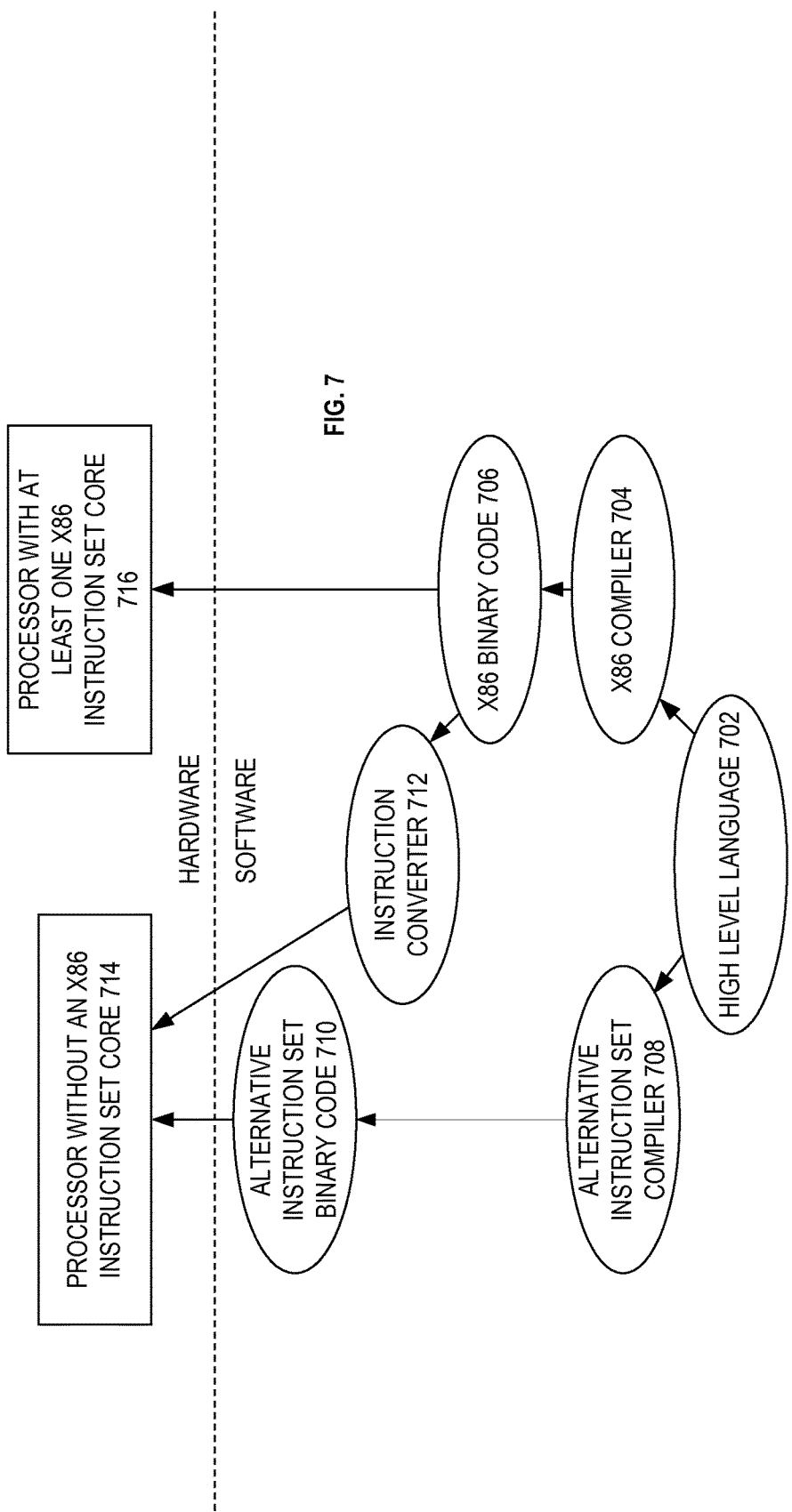
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Improved Thread Selection

The embodiments of the invention described below include techniques to classify instructions in the dynamic stream which will incur a significant latency event (sometimes referred to herein as "delinquent instructions") and use the classification to perform efficient thread selection in a multithreaded processor. In particular, one embodiment of the invention relies on an IP-indexed table that tracks which instructions have triggered long latency events in the past. Thread selection logic relies on this IP-indexed table to implement an intelligent thread selection policy (TSP) for selecting threads at various stages of the processor pipeline. The TSP can be queried at the same time as the branch prediction unit (BPU), or later in the front-end (FE) unit of the processor. The query points are referred to herein as Thread Selection Points.

In one embodiment, at each thread selection point, the table is consulted, a heuristic examines the information gathered, and deems the dynamic instruction as delinquent or not. Thread selection may then be performed on a likelihood-to-do-forward-progress basis, with fairness also present.

Figure 8:
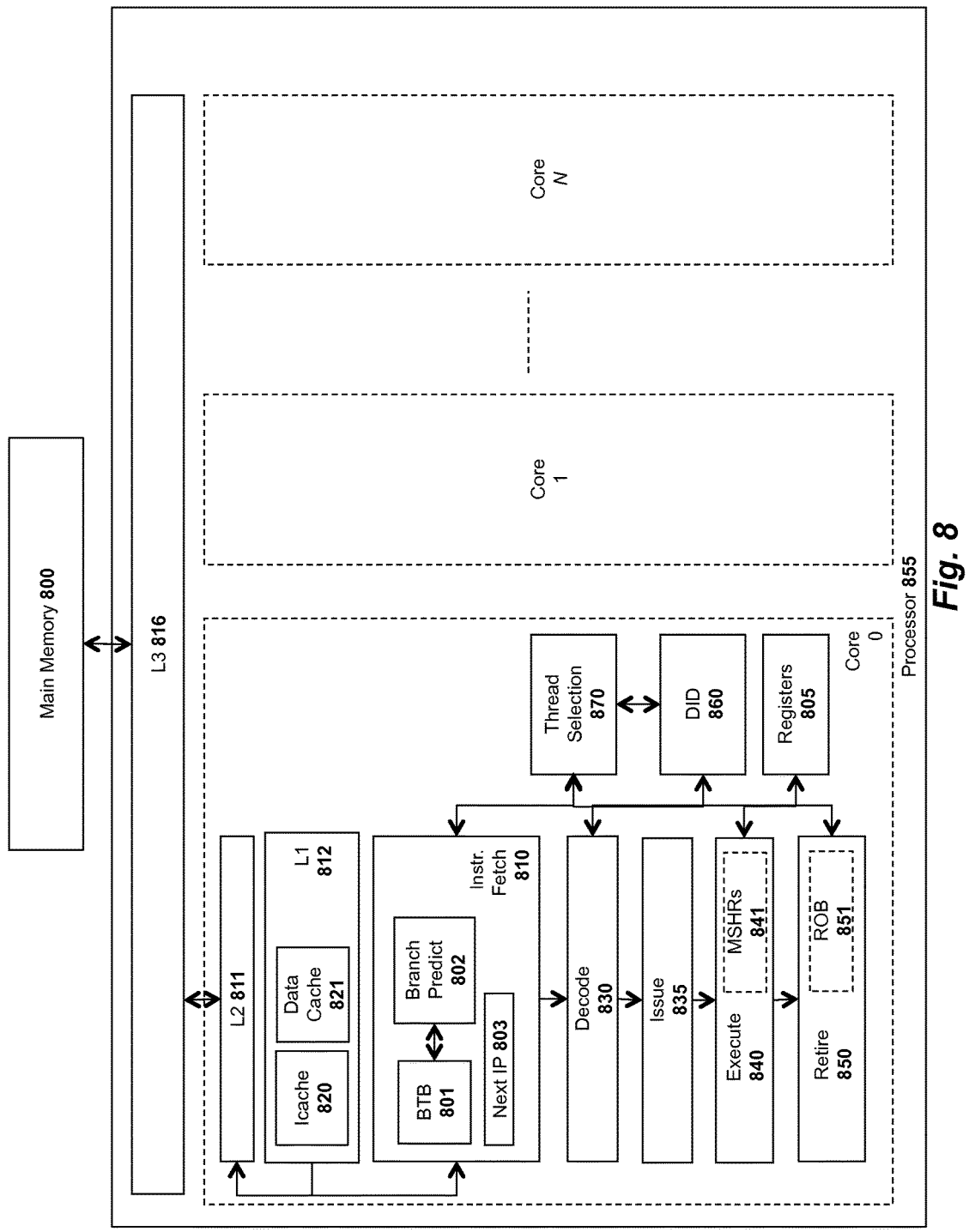
FIG. 8 illustrates a one embodiment of a processor architecture on which thread selection techniques may be implemented.

As illustrated in FIG. 8, an exemplary processor 855 on which embodiments of the invention may be implemented includes a plurality of execution stages including an instruction fetch stage 810 (including a branch prediction sub-stage 802), a decode stage 830, an issue stage 835, an execution stage 840, and a retire stage 850. A register set 805 provides register storage for operands, control data and other types of data as each stage performs its operations on the instruction stream. In addition, the illustrated embodiment includes thread selection logic 870 for selecting an instruction stream for processing at each stage (or a subset of stages) based on the instruction history maintained in a delinquent instruction detector (DID) 860. The DID 860 and thread selection logic 870 are described in greater detail below with respect to FIG. 9.

The details of a single processor core ("Core 0") are illustrated in FIG. 8 for simplicity. It will be understood, however, that each core shown in FIG. 8 may have the same set of logic as Core 0. As illustrated, each core may also include a dedicated Level 1 (L1) cache 812 and Level 2 (L2) cache 811 for caching instructions and data according to a specified cache management policy. The L1 cache 811 includes a separate instruction cache 120 for storing instructions and a separate data cache 121 for storing data. The instructions and data stored within the various processor caches are managed at the granularity of cache lines which may be a fixed size (e.g., 64, 128, 512 Bytes in length). Although not illustrated in FIG. 8 for simplicity, the L1 and L2 levels may also include separate translation look-aside buffers (TLBs) for caching logical to physical address translations to reduce memory access latency. Moreover, separate instruction TLBs (ITLBs) and data TLBs (DTLBs) may be used to segregate translations for instructions and data, respectively (e.g., such as the ITLB 804 described below with respect to the instruction fetch stage 810).

Within each core, the instruction fetch stage 810 fetches instructions from main memory 800 and/or a shared Level 3

(L3) cache 816; the decode stage 830 decodes the instructions (e.g., decoding program instructions into micro-operatons or "uops"); the issue stage 835 schedules and dispatches the instructions for execution by functional units of the execution stage 840; and the retire stage 850 reorders the instructions (in an out-of-order execution pipeline) and writes back the results of the instruction execution to the register file 805.

The instruction fetch unit 810 includes various well known components including a next instruction pointer 803 for storing the address of the next instruction to be fetched from memory 800 (or one of the caches); a branch prediction unit 802 for speculatively predicting instruction branch addresses; and branch target buffers (BTBs) 801 for storing branch addresses and target addresses. Once fetched, instructions are then streamed to the remaining stages of the instruction pipeline.

In one embodiment, the execution stage includes a set of miss status holding registers (MSHRs) 841 which store data related to instructions with pending misses to the caches and/or TLBs. In particular, the MSHRs may store data related to cache misses such as the physical address of the block; the word in the block; the destination register number (if data). The MSHRs may also include a mechanism to merge requests to the same block and a mechanism to insure accesses to the same location execute in program order. While shown within the execution stage 840 for the sake of illustration, the MSHRs 841 may actually be implemented as part of the register set 805.

In addition, a reorder buffer 851 is utilized at the retire stage 850 to return the executed instructions back to the original program order after the instructions have finished execution in the out-of-order pipeline. In one embodiment, the reorder buffer maintains an ordered list of the instructions in the pipeline. Instructions are added at one end of the list when they are dispatched and they are removed from the other end of the list when they are completed. In this way, instructions will be completed in the same order as they were dispatched.

The structure and function of each of the above pipeline stages and functional units is well understood by those of ordinary skill in the art and will not be described here in detail to avoid obscuring the pertinent aspects of the different embodiments of the invention.

Figure 9:
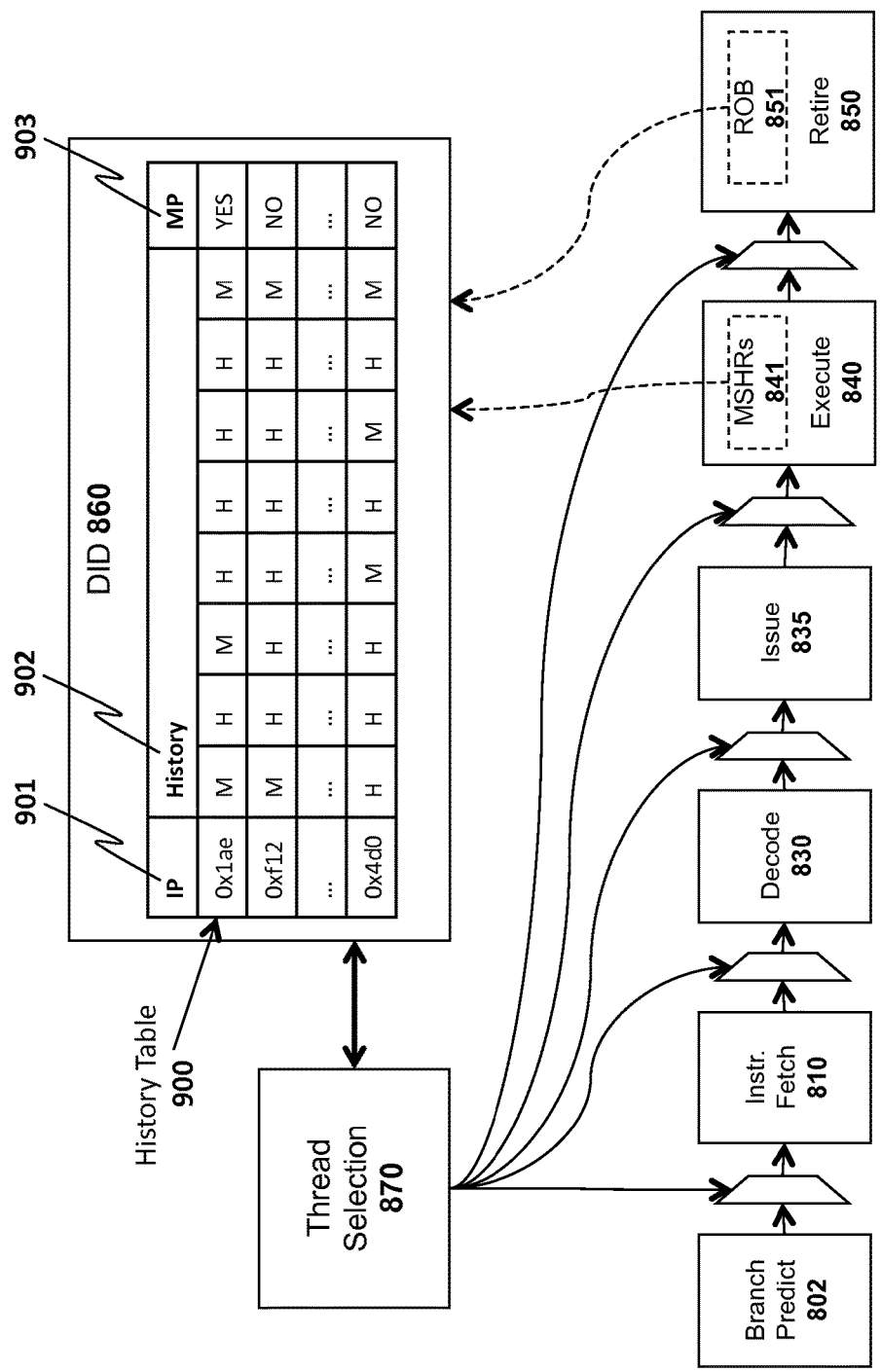
FIG. 9 illustrates one embodiment of the invention for improved thread selection.

Additional details associated with the thread selection logic 870 and the DID 860 are provided in FIG. 9. In particular, the thread selection logic 870 selects instructions to be processed at the various pipeline stages 802, 810, 830, 835, 840, and 850 in accordance with cache/TLB hit/miss history data maintained for each instruction in the history table 900 of the DID 860. In the illustrated embodiment, each entry in the history table 900 is indexed with an instruction pointer 901 (i.e., a pointer identifying the location of the instruction in the memory subsystem) and includes a plurality of history bits 902 to indicate historical hits and misses to the L1 cache, L2 cache, and/or the TLB. In the example shown in FIG. 8, the history includes 8 bits for each entry; however, more or fewer bits may be maintained while still complying with the underlying principles of the invention.

As illustrated, in one embodiment, the DID 860 interfaces with the reorder buffer (ROB) 851 at Retire Stage 841, the MSHRs 841 at the execution stage 840, and with the thread selection logic 870. In one embodiment, the DID 860 is updated as follows in response to memory delinquent instruction (e.g., loads). When an instruction fails in the TLB, Level 1 Data Cache (DL1), and/or L2 Cache (L2), it marks a designated bit or set of bits in its ROB entry. Later, when the instruction reaches the head of the ROB and is retired, it sends its instruction pointer, sometimes referred to herein as the program counter (PC), along with the bits indicating the memory access status. For example, in one embodiment, the bits are used to indicate a hit or a miss to the TLB, L1, and/or L2. Once received by the DID, 860 the bits indicating the memory access status are then used to update the DID history table 900. If the instruction does not have an existing entry (e.g., if the PC is not identified in the history table 900), a new entry is reserved. In one embodiment, the DID 860 implements a least recently used eviction policy in which an entry which has been accessed least recently than any other entries is removed to make space for the new entry. The new entry, indexed by its PC value 901, is marked as a memory delinquent instruction. In one embodiment the miss pending field 903 may be updated to a Yes (e.g., a binary 1) or No (e.g., a binary 0) in accordance with miss pending data read from the MSHRs 841 and/or the ROB 851.

In one embodiment, the lookup process is slightly adjusted based on the particular pipeline stage in which it is implemented. However, the following discussion may be applied to any pipeline stage. It is assumed to be applied to a single instruction inst with address PC, from the active thread, t, being processed at the current stage. In one embodiment, the regular processing is done for inst and the DID history table 900 is looked up using the PC. The information obtained, or the lack thereof is passed, along with any relevant information already known about the instruction to the thread selection logic 870. In one embodiment, the thread selection logic 870 implements a policy to select a thread t+ and potentially some other stage-dependent information. Using all of the information such as the history data 902 and miss pending data 903, if the thread selection logic 870 does not select a new thread for the next cycle, i.e., t=t+, then any stage information that may require updating is updated as usual. In the case that the thread selection logic selects a new thread, i.e., t≠t+, then inst may be identified as a "selection point." In one embodiment, the pipeline stage is updated using any information the thread selection logic 870 may have produced, and t is set to t+ for the new cycle. As an illustration, if implemented at the Branch Prediction stage 802, then when the history table 900 is looked up as described above, the prediction for PC+ is passed along with the information provided by the DID 860 to the thread selection logic 870. In addition, the value of PC can be updated to its current value, in case it is desired to replay delinquent instructions.

Figure 10:
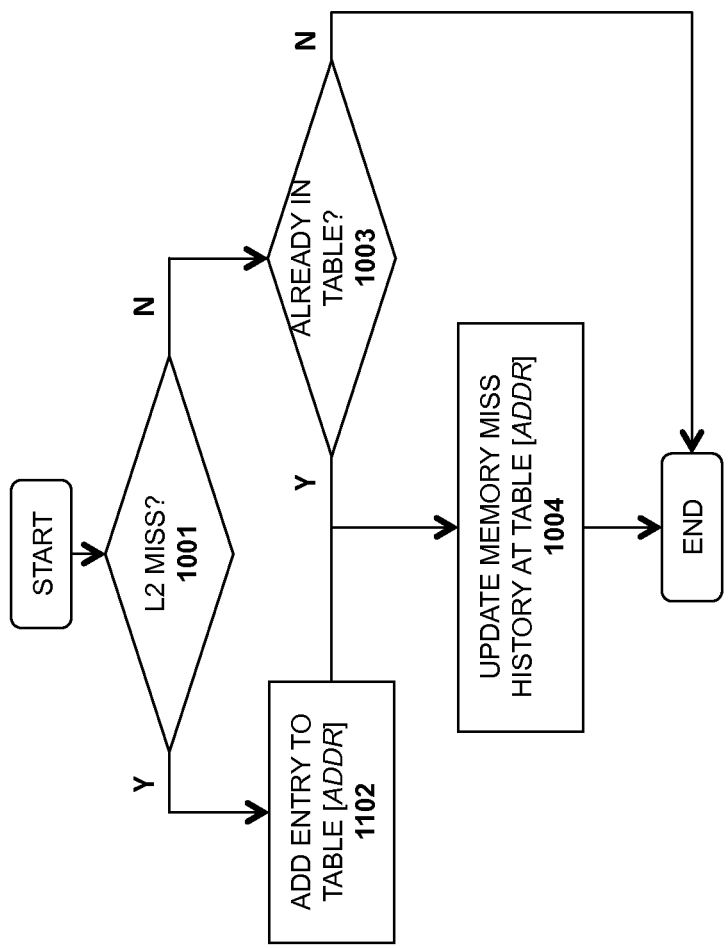
FIG. 10 illustrates one embodiment of a method for detecting a miss and updating a history table.

FIG. 10 illustrates one embodiment of a method for updating a history table within the DID. The method may be implemented within the context of the architecture shown in FIG. 9, but is not limited to any particular processor architecture. For the sake of simplicity, the illustrated flowchart only takes L2 misses into account. However, the same basic principles may be readily applied to L1 or TLB misses.

If an L2 miss is detected at 1001, then at 1102, a new entry is added to the history table using the PC address value for the instruction as an index. At 1004 the memory miss history is updated within the table entry (e.g., indicating a specified number of hits/misses the last N times the instruction was encountered). If no L2 miss is detected at 1001, then a determination is made at 1003 as to whether an entry for the PC of the current instruction is already in the table. For example, a search may be performed in the table using the PC address as an index to the table. If an entry is found in the table, then at 1004 the entry is updated with the new history data.

Figure 11:
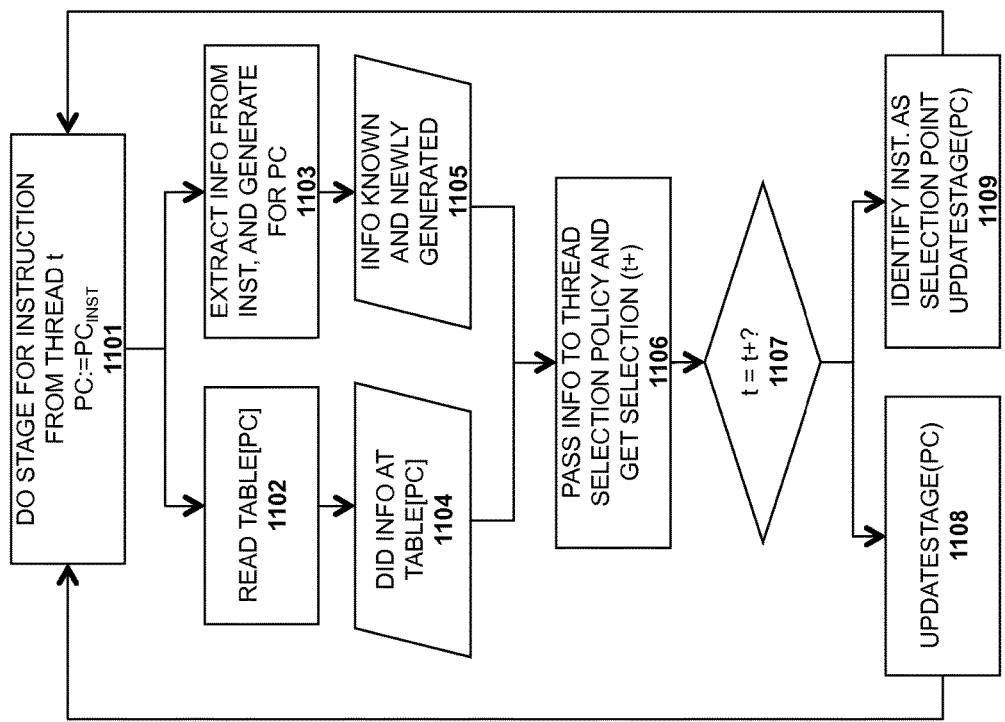
FIG. 11 illustrates a method for implementing a thread selection policy using history data.

FIG. 11 illustrates one embodiment of a method for using the history table within the DID to make thread selection decisions. At 1101, a thread t is ready to be processed in a particular stage of the processor pipeline. The instruction to be executed next has a program counter value, PC. At 1102 the history table is indexed using the PC value (i.e., to identify the relevant entry) and at 1104 the history data is collected from the table. Concurrently, at 1103, information is extracted from the instruction and/or information may be generated which may be useful for implementing the thread selection policy. As indicated at 1105, the information may be known (e.g., extracted from the instruction) or newly generated (e.g., generated based on the instruction or the current state of the pipeline).

At 1106, the collected information is passed to the thread selection logic which implements a thread selection policy to identify the next thread to be executed, t+. At 1107, a determination is made as to whether the same thread is selected as that selected in the prior processor cycle (i.e., if t=t+). If so, then the instruction for thread t is executed and updates to the stage are generated at 1108. If not, then at 1109, the instruction may be identified as a selection point, and the stage is updated taking into account any information the tread selection logic may have produced.

In one embodiment, the thread selection logic implements a two-step process. The first step involves determining whether to select a new thread or keep using the same thread. This decision may be implemented using a variety of selection policies including, but not limited to, the following:

Switch Always: This policy selects a new thread whenever the information at table[PC] is valid. That is, if the PC has had at least one delinquent execution, the thread selection logic selects a different thread.

Switch on DL1<N>/<H>: This policy expects the DID to pass <H> bits of information corresponding to the DL1 (L1 Data Cache) miss status of the latest <H> executions of the instruction PC. If there are at least <N> misses among them, then a new thread is selected. As an illustration, consider N=2, H=8 as illustrated by instruction 0xf12 in FIG. 9. In this example, the DID 860 maintains 8 bits of information ordered from oldest to most recent. The history, MHHHHHHM, contains 2 misses. Because 2≥N, the instruction is deemed to be delinquent. In the case that the execution hits DL1, the new history is HHHHHHMH, so the next time the DID is asked, 1<N, so the instruction will be deemed non-delinquent.

Switch on L2<N>/<H>: This policy is pretty much like Switch on DL1, the difference being the semantic of the bits. In this case the history corresponds to L2 access status. In this embodiment, a DL1 miss followed by an L2 miss is considered an L2 miss; any other case is considered an L2 hit.

Switch on L2 or dTLB <N>/<H>: This policy is similar to Switch on L2, the difference being that each history entry has 2 bits. In this case the history corresponds to dTLB and L2 access status. As in the prior embodiment, a DL1 miss followed by an L2 miss is considered an L2 miss; any other case is considered an L2 hit.

The second step is, if a new thread is selected, determining which one to select among those available. For this choice, one embodiment of the invention uses the following information:

Memory miss pending: If the instruction that was predicted to miss on the L2 or dTLB actually missed and the miss is not yet resolved, give that thread lower priority. The information related to pending misses may be received through the MSHRs 841 (miss pending) and the ROB 851 (if an instruction retires is because any possible miss has been already served).

Fairness: A bucket/credit like policy may be implemented to guarantee fairness, so that in the event of a memory-bound workload and a CPU-bound workload, the former is not starved due to the scarcity of memory misses in the latter.

In one embodiment, the function f:{threads}→R combines the bucket/credit policy mentioned above with the amount of cycles the memory miss has been pending and the amount of pending branches. In one embodiment, the function f picks the thread that has spent the longest time/cycles without executing. If there are threads with no misses pending, f only considers those. If all threads have misses pending, f considers all of them. The policy orders the threads using f and selects the thread t such that $f(t) \leq f(u)$ for each u∈Threads (referred to as t+ in FIG. 11) which is returned to the stage to be used until the thread selection logic decides to select a different thread later in the future.

One significant difference between the embodiments of the invention and prior implementations is that the consumer of the information is not the software/firmware layer, but the thread selection policy implemented by the thread selection logic. The above embodiments gather information in a fashion that has the hardware itself as a consumer. As such, it does not require a software layer to configure and manage it. In addition, performing thread selection with long latency event info leads to better performance than plain round-robin schemes because stalled threads are not allowed to allocate resources for instructions that will take a long time to execute. This leads to a better usage of shared resources.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   first logic to maintain a history table comprising a plurality of entries, each entry in the history table associated with an instruction executed by an execution unit of said processor and including history data indicating prior hits and/or misses to a cache level of a cache memory and/or a translation lookaside buffer (TLB) for said instruction, the history table is indexed by an instruction pointer address associated with each instruction executed by said processor, wherein maintaining the history table comprises updating the history table with data from instructions in a reorder buffer (ROB) and/or from one or more miss status holding registers (MSHRs) of said processor; and
   thread selection logic to select a particular thread for execution at a particular processor pipeline stage based on the history data.

2. The processor as in claim 1 wherein said cache level includes a Level 1 (L1) data cache and/or a Level 2 (L2) cache.

3. The processor as in claim 1 wherein the TLB comprises a data TLB (dTLB).

4. The processor as in claim 1 wherein the thread selection logic implements a thread selection policy based on the history data for a current instruction to determine whether to execute a current thread associated with the current instruction or a different thread.

5. The processor as in claim 4 wherein the thread selection policy comprises switching to the different thread if an entry within the history table indicates at least one execution of the current instruction which resulted in a miss.

6. The processor as in claim 4 wherein the thread selection policy comprises a number of misses above a specified threshold value for the L1 cache, L2 cache, or TLB.

7. The processor as in claim 6 wherein if the thread selection logic determines that a different thread is to be processed, then the thread selection logic identifies the different thread by evaluating pending misses for each thread and/or implementing a fairness protocol to ensure that all threads are permitted sufficient processing time.

8. The processor as in claim 1 wherein the particular processor pipeline stage is selected from a group comprising a branch prediction stage, an instruction fetch stage, a decode stage, an issue stage, an execution stage, and a retire stage.

9. A method comprising:
   maintaining a history table, by a processor, comprising a plurality of entries, each entry in the history table associated with an instruction executed by an execution unit of said processor and including history data indicating prior hits and/or misses to a cache level of a cache memory and/or a translation lookaside buffer (TLB) for said instruction, the history table is indexed by an instruction pointer address associated with each instruction executed by said processor, wherein maintaining the history table comprises updating the history table with data from instructions in a reorder buffer (ROB) and/or from one or more miss status holding registers (MSHRs) of said processor; and
   selecting by said processor a particular thread for execution at a particular processor pipeline stage based on the history data.

10. The method as in claim 9 wherein said cache level includes a Level 1 (L1) data cache and/or a Level 2 (L2) cache.

11. The method as in claim 9 wherein the TLB comprises a data TLB (dTLB).

12. The method as in claim 9 further comprising:
   implementing a thread selection policy based on the history data for a current instruction to determine whether to execute a current thread associated with the current instruction or a different thread.

13. The method as in claim 12 wherein the thread selection policy comprises switching to the different thread if an entry within the history table indicates at least one execution of the current instruction which resulted in a miss.

14. The method as in claim 12 wherein the thread selection policy comprises a number of misses above a specified threshold value for the L1 cache, L2 cache, or TLB.

15. The method as in claim 14 wherein if a determination is made that a different thread is to be processed, then identifying the different thread by evaluating pending misses for each thread and/or implementing a fairness protocol to ensure that all threads are permitted sufficient processing time.

16. The method as in claim 9 wherein the particular processor pipeline stage is selected from a group comprising a branch prediction stage, an instruction fetch stage, a decode stage, an issue stage, an execution stage, and a retire stage.

* * * * *